(12) United States Patent
Naim et al.

(10) Patent No.: US 10,187,894 B1
(45) Date of Patent: Jan. 22, 2019

(54) SYSTEMS AND METHODS FOR IMPROVING VOICE OVER IP CAPACITY IN A WIRELESS NETWORK

(71) Applicant: Sprint Spectrum LP, Overland Park, KS (US)

(72) Inventors: Muhammad Ahsan Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 972 days.

(21) Appl. No.: 14/539,013

(22) Filed: Nov. 12, 2014

(51) Int. Cl.
| | | |
|---|---|---|
| H04W 72/04 | (2009.01) | |
| H04W 28/02 | (2009.01) | |
| H04W 28/06 | (2009.01) | |
| G10L 25/30 | (2013.01) | |
| H04W 88/06 | (2009.01) | |

(52) U.S. Cl.
CPC ........... *H04W 72/048* (2013.01); *G10L 25/30* (2013.01); *H04W 28/0215* (2013.01); *H04W 28/065* (2013.01); *H04W 88/06* (2013.01)

(58) Field of Classification Search
CPC ... H04W 72/048; H04W 36/24; H04W 88/06; G10L 25/30; H04L 1/0017; H04L 1/0021
See application file for complete search history.

(56) References Cited

U.S. PATENT DOCUMENTS

| | | |
|---|---|---|
| 6,504,910 B1 | 1/2003 | Engelke et al. |
| 2007/0083367 A1 | 4/2007 | Baudino et al. |
| 2014/0136208 A1* | 5/2014 | Maltseff ................ G10L 13/033 704/260 |
| 2015/0009865 A1* | 1/2015 | Sharma ..................... H04L 5/16 370/277 |

* cited by examiner

*Primary Examiner* — Derrick W Ferris
*Assistant Examiner* — Kevin H Lee

(57) ABSTRACT

Systems and methods are described for improving capacity of voice services for data packet transmission through a wireless network. Application requirements including a data rate for a wireless device may be determined. An access node may determine available resources to transmit data as indicated by the application requirements. The wireless device and the access node may communicate data transmissions wirelessly for use by the wireless device application. Data transmission may be in a first mode or in a second mode depending whether there are sufficient available network resources for the determined data rate. The first and second transmission modes may be generated from a common input such as a wireless device user's voice; however, the second mode of data transmission may be converted in order to consume less network resources.

8 Claims, 6 Drawing Sheets

US 10,187,894 B1

SYSTEMS AND METHODS FOR IMPROVING VOICE OVER IP CAPACITY IN A WIRELESS NETWORK

TECHNICAL BACKGROUND

Voice over Internet Protocol (VoIP) and Voice over Long Term Evolution (VoLTE) are methodologies for delivering data packets containing digital information representing an audio signal generated by a user of a wireless device during a voice call. The wireless device may be capable of wireless communication with one or more access nodes in a wireless network which is in further communication with a network such as the internet. In order to use VoIP or VoLTE, there must be sufficient network resources available within access nodes and network nodes used to transmit the data packets.

One limiting factor regarding availability of network resources is an air interface, which is the wireless communication between the wireless device and the one or more access nodes. A network node in communication with the access node may also determine availability of resources throughout the network, including access network backhaul resources, node processing resources, and core network resources. When a network is congested, there may not be sufficient network resources at any point along the transmission path to transmit voice data packets, and so calls may be blocked, and a user of the wireless device may be frustrated. In addition, if a large number of calls are blocked over time, this may result in significant revenue loss for a network operator.

Overview

Systems and methods are described for improving VoIP and/or VoLTE capacity in a wireless network. A wireless device may initiate persistent communication with an access node that is connected to a network. The access node may determine application requirements for the wireless device, including a data rate for the persistent communication. At some point during the voice call, it may be determined that there are insufficient network resources to satisfy the determined application requirements.

When there are insufficient network resources available to transmit at the determined data rate, data packets between the wireless device and the access node may be converted from a first mode of data transmission to a second mode of data transmission. If available network resources change position relative to the network resources threshold during the voice call, then data packet transmission may be converted back to the first mode of data transmission, continuing to convert as appropriate based on continued monitoring of capacity. The second data mode of data transmission may require less network resources than the first mode of data transmission, and the amount of network resources required may be measured as a total number of data packets or an average or peak data rate for transmission.

DETAILED DESCRIPTION

Figure 1:
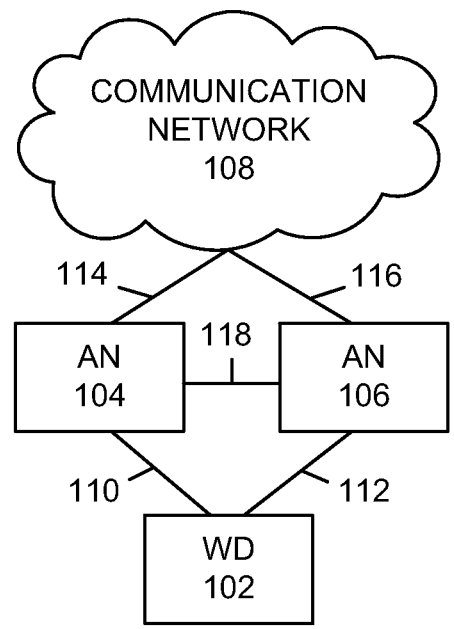
FIG. 1 illustrates an exemplary communication system used to improve VoIP or VoLTE capacity in a wireless network.

FIG. 1 illustrates an exemplary communication system 100 that may be used to improve VoIP capacity in a wireless network, the system 100 comprising wireless device 102, access nodes 104 and 106, communication network 108, and communication links 110, 112, 114, and 116.

Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 may be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and may be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 may comprise a serving access node for wireless device 102.

Although only two access nodes 104 and 106 are illustrated in FIG. 1, wireless device 102 can be in communication with additional access nodes. The plurality of access nodes may be associated with different networks and may support different communication protocols and radio access technologies.

Communication network 108 may comprise a wired and/or wireless communication network, and may comprise processing nodes, routers, gateways, and physical and/or wireless data links for carrying data among various network elements, including combinations thereof, and can include a local area network, a wide area network, and an internetwork (including the Internet). Communication network 108 may be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 may be wired or wireless communication links. Wired communication links may comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Wireless device 102 may receive signals from the one or more access nodes 104 and 106 in order to establish wireless communication with at least one access node. Wireless device 102 may select a serving access node, which for example may be access node 104. Signal measurement reports between wireless device 102 and serving access 104 may be monitored for a variety of reasons, and in some exemplary embodiments, monitoring of signal measurements reports may be based on network conditions or events such as access node density or deployment of a new access node.

Access nodes 104 and 106 or other network nodes in network 108 may monitor a network characteristic along a communication path between wireless device 102 and its intended VoIP target. A network characteristic may represent network congestion, and may further indicate a capacity to handle an amount of data or a data rate. When congestion is detected by the access node or other network node, wireless devices and other access nodes that are transmitting data packets may be instructed to transmit in a data transmission mode that uses a lower data rate. Even though the network is congested, there may still be sufficient capacity to transmit at the lower data rate.

In various wireless networks including exemplary embodiments such as 3G and 4G LTE, an instantaneous data rate for voice applications in a "talk" period may be in a range of ~150-400 kbps. Over time, an average data rate for voice applications with "silence" periods and data header compression may be in a range of ~8-20 kbps. However, other data packets such as those containing text may consume far less network resources and may not have application requirements including a guaranteed bit rate (GBR) or the same frequency of persistent scheduling as data packets containing voice.

An access node that has detected network congestion may instruct a wireless device to communicate using the different mode of data transmission noted above. For example, the wireless device may be able to send text messages, as the text within the data packets may be transmitted with less use of network resources. In an exemplary embodiment, it may be possible to communicate between the serving access node and the wireless devices using a small fraction of the data rates required for voice.

In a non-transparent mode, a user of a wireless device may manually activate a voice-to-text mode VoIP or VoLTE, in order to provide a security measure against dropped calls.

In a transparent mode, activation of the voice-to-text mode VoIP or VoLTE may be performed according to an instruction from a network node, such as the serving access node or another access node on the side of the intended receiver that determines an instantaneous network capacity below a minimum capacity threshold. A network node may continue to monitor network congestion, and if capacity improves, it may be desirable for the network node to instruct all transmitters and receivers in a path of data transmission to return to transmitting and receiving regular voice data packets.

The node monitoring network congestion or another network node may instruct each of the network nodes regarding the current transmission mode, so that each network node may prepare appropriate resources to transmit, receive, and/or convert data at a data rate corresponding to the instructed mode of data transmission. Each access node and network node may be configured to convert from voice-to-text or text-to-voice, and instructions to convert may be provided to at least one of a plurality of network nodes, depending on where network congestion is located in the transmission path. Wireless devices themselves may also be capable of converting from voice-to-text, and then transmitting text data packets to a serving access node. A receiver wireless device may also be capable of converting from text-to-voice in order to enable audio playback.

Figure 2:
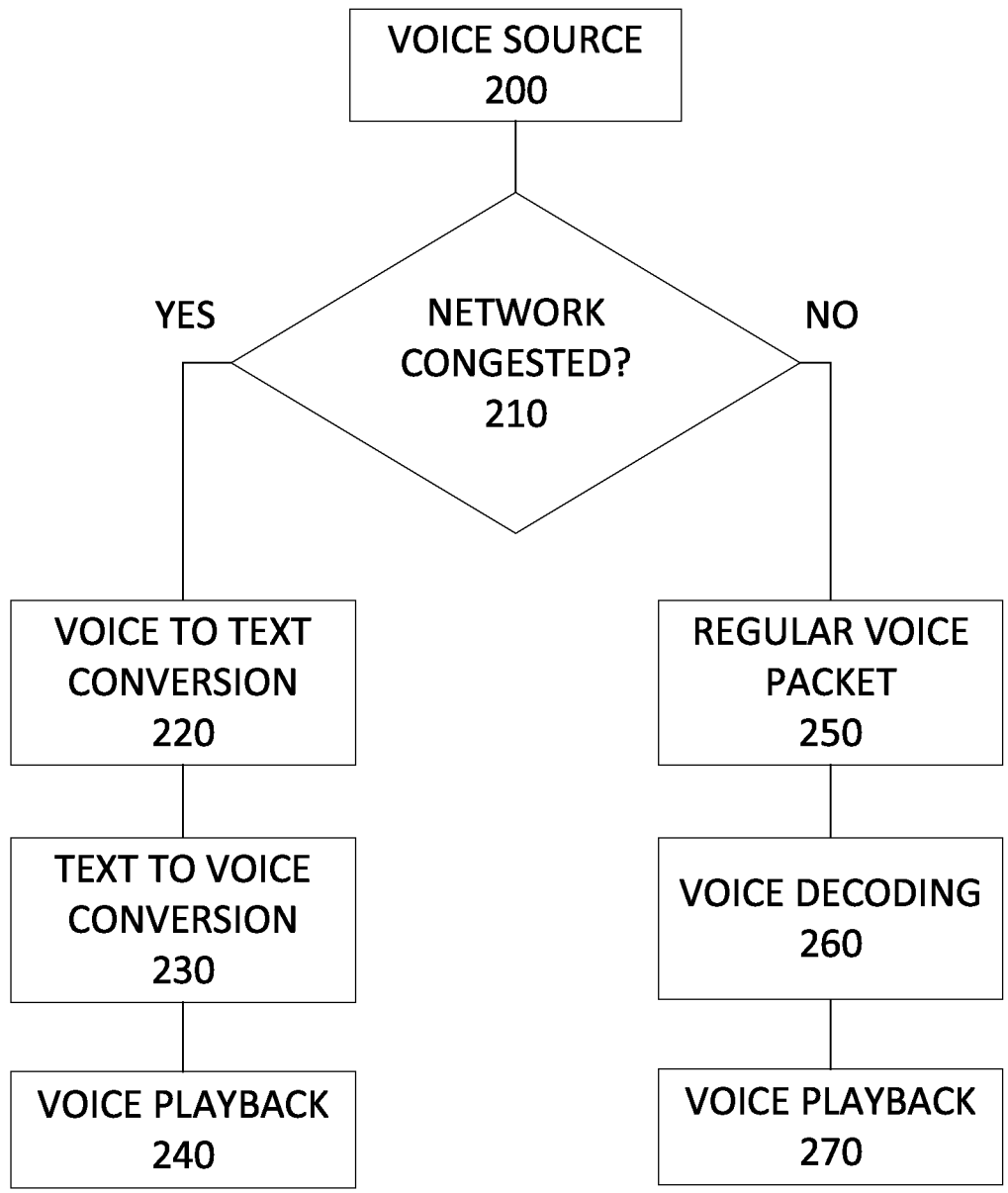
FIG. 2 illustrates an exemplary embodiment of a flowchart used to improve VoIP or VoLTE capacity in a wireless network.

FIG. 2 illustrates an exemplary embodiment of a determination 210 of a mode for wireless transmission of a voice source 200 as a regular voice packet 250 or as a converted text packet 220, and subsequent receiving and either decoding 260, or converting 230, before playing an at one of voice sink 240 or 270.

At initial block 200, a VoIP call is initiated and a wireless device such as wireless device 102 establishes wireless communication with an access node such as access nodes 104 and/or 106. Regarding an exemplary embodiment of determination 210, either access node or a network node may monitor the instantaneous congestion level of the network along an intended transmission path for the established VoIP call.

Often the limiting factor for network capacity is at the air interface between a wireless device and its serving access node(s). For at least this reason, it may be desirable to monitor network conditions at the serving access nodes providing network congestion information to the various access nodes, using controller nodes or direct communication links between access nodes, such as X2 links. Once congestion information for an air interface and other network resources are determined, it may be desirable to use this network congestion information to instruct wireless devices regarding a mode of data transmission for which there may still be network capacity during a determined network congestion condition.

At block 220, when the instantaneous network capacity is below a threshold (i.e. at least one node in the network is congested), a serving access node such as one of access nodes 104 and 106 may provide this information to the wireless device 102, and the wireless device may convert voice contained in the audio signal of the call into corresponding text of the words dictated. The location of the conversion may be determined by the particular network node experiencing congestion.

At block 230, text data packets which were transmitted wirelessly are received by a receiving access node or wireless device. Depending upon available resources, user defined preferences, or use of voice-recognition software such as neural networks, the received text data packets may be converted back to voice at the receiving access node, or at the wireless device itself.

At block 240, the reconverted voice is played for a user of the receiving wireless device. Various modifications may be made to the voice based on analysis of vocal characteristics in order to make a playback voice as similar as possible to the actual voice of the original audio information.

If determination 210 results in a finding that the instantaneous network capacity is above the threshold, and the wireless channel and all other nodes are not in a congested condition, then the wireless devices and access nodes may operate under normal conditions for the VoIP or VoLTE call. That is, a regular packet may be coded and transmitted at block 250 over the indicated wireless channel to a receiver at block 260 where it is decoded conventionally, then either further transmitted or played directly at a voice sink at block 270.

Figure 3:
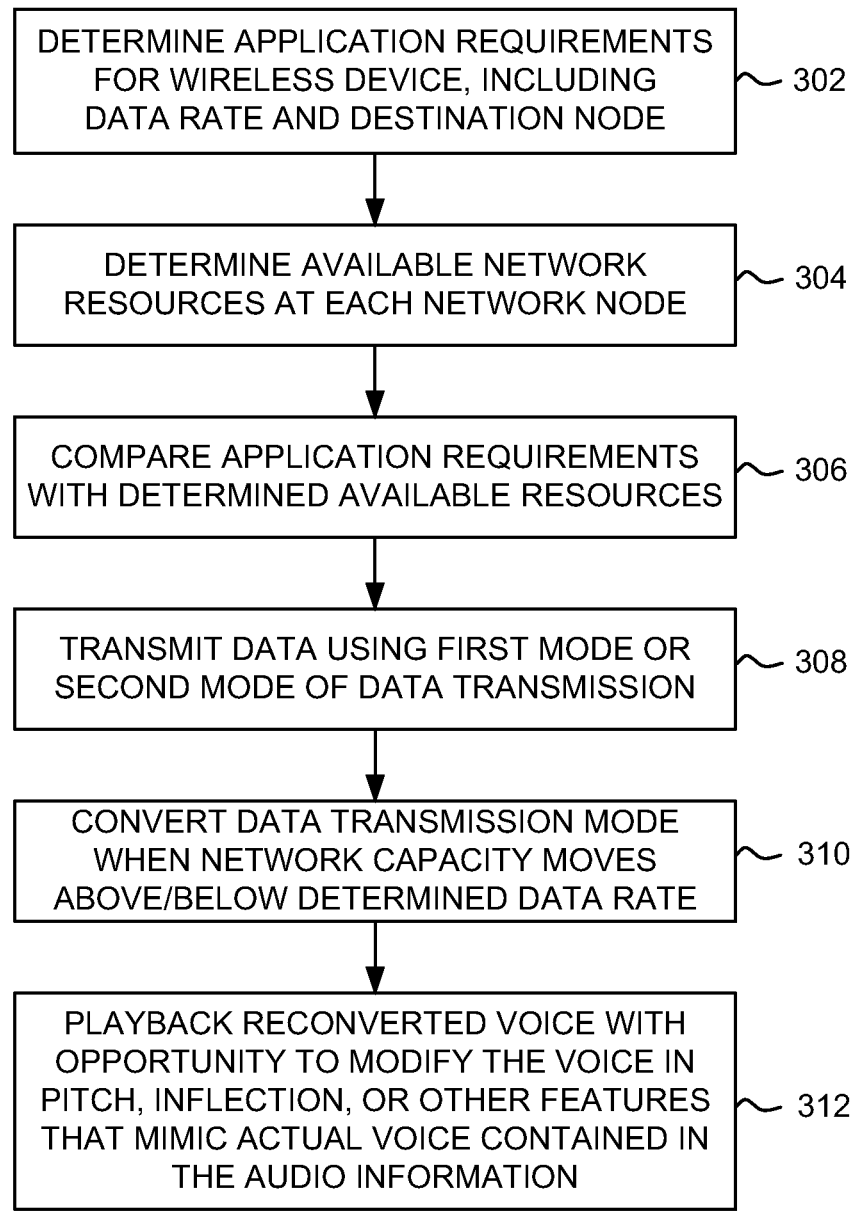
FIG. 3 illustrates an exemplary method of improving VoIP or VoLTE capacity in a wireless network.

FIG. 3 illustrates an exemplary method for improving VoIP or VoLTE capacity in a wireless network. The present disclosure refers to application requirements, which may comprise a quality of service, a type of service, or any other suitable metric for indicating what type of data and how many data packets the application may require. In an exemplary embodiment, application requirements may indicate a data rate or a type of service associated with various uplink and downlink resource requirements. The application requirements may further indicate a destination node for a VoIP call, as well as a request for discrete, persistent, or semi-persistent control of data packet transmission.

Referring to FIG. 3, at step 302, application requirements are determined for a wireless device. The application requirements may include a data rate or a type of service for an application on the wireless device or in the network and accessed by the wireless device. For example, the type of service may be voice, or the application may require a certain GBR. These exemplary embodiments of application requirements may indicate a data rate required by an application to provide services without any undesirable lapse in, or loss of, service.

At step 304, network capacity for wireless device services may be determined by the access node and transmitted to the wireless device. The determined network capacity may relate to an amount of available network resources for controlling and data bearing within the access node and other network nodes, as indicated by the application requirements.

At step 306, the determined application requirements are compared with the determined network resources at each node between the wireless device and the destination node. The comparison provides a finding as to whether the network resources are sufficient for the determined application requirements, which in an exemplary embodiment may be a data rate for VoIP.

At step 308, data transmission from the wireless device or the access node occurs using a first mode of data transmission when the determined network resources at each network node are sufficient to transmit at the determined data rate, and using a second mode of data transmission when the determined network resources are less than the determined data rate. The origin of the data transmission (wireless device, access node, or network node) may be related to whether the wireless device is sending or receiving, the type of service provided, and the symmetry or asymmetry of the data transmission patterns over time.

If a wireless device is transmitting the data according to this exemplary embodiment, it will have to be capable of producing and transmitting data packets in both data transmission modes. However, an access node transmitting to a wireless device may also need to be able produce and/or convert data packets in both modes before transmission to the receiving wireless device.

At step 310, the mode of data transmission may be converted at any time it is determined that the available network resources change relative position with respect to the determined application requirements (e.g. data rate). That is, in an exemplary embodiment, if the wireless device is transmitting in the second mode and the determined network resources increase above the determined data rate, the wireless device may convert to the first mode. Conversely, if the wireless device is transmitting in the first mode and the determined network resources at any network node in the transmission path fall below the determined data rate, the wireless device may convert back to the second mode of data transmission.

At step 312, data in either the first mode or the second mode may be transmitted to a network node. The network node may be another wireless device with which the access node is in wireless communication, another access node, a gateway node, or a controller node. The network node may decode the voice packets or convert the text to an audio signal, and the audio signal containing the decoded voice packets or the reconverted voice from the text data packets may be played back at a destination. Various machine learning tools or user profiles may be used to modify playback voice in terms of pitch, inflection, or other audio features in order to mimic the actual voice contained in the original audio signal. Network nodes may use neural networks to communicate and learn audio features of different users over time, or users themselves may configure playback voice preferences.

Figure 4:
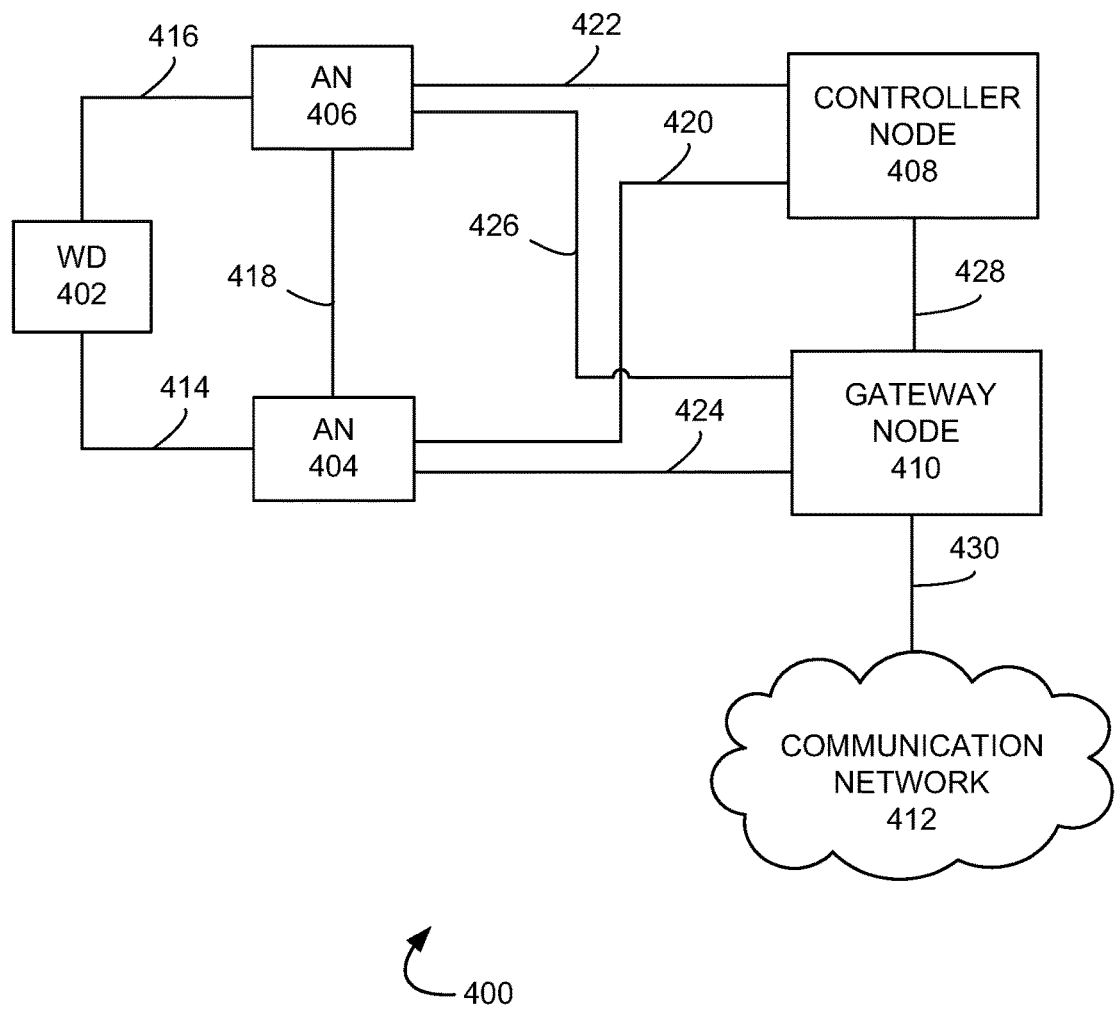
FIG. 4 illustrates another exemplary system used to improve VoIP or VoLTE capacity in a wireless network.

FIG. 4 illustrates another exemplary communication system 400 to improve VoIP capacity in a wireless network. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet).

Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
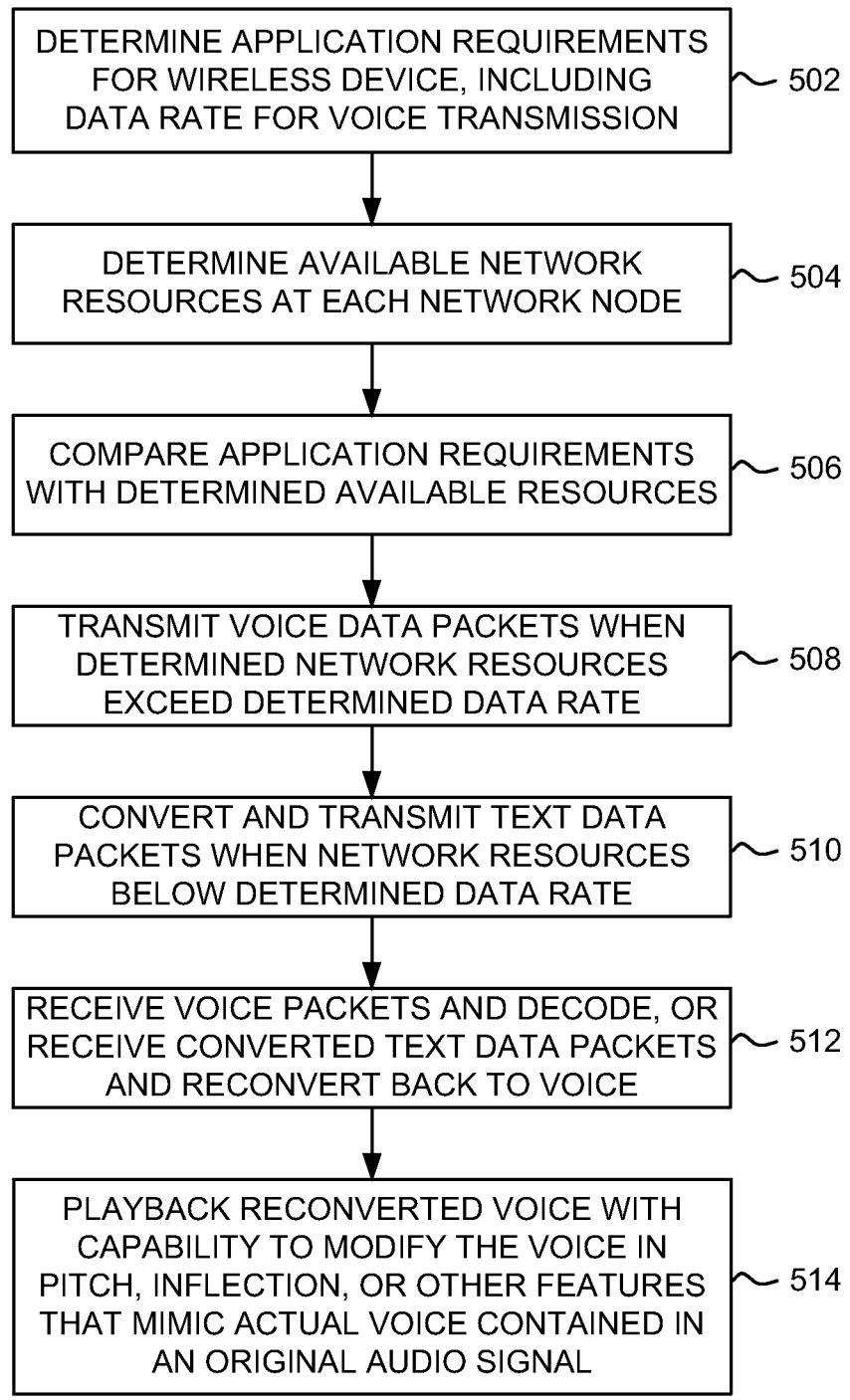
FIG. 5 illustrates another exemplary method of improving VoIP or VoLTE capacity in a wireless network.

FIG. 5 illustrates an exemplary method for improving VoIP or VoLTE capacity in a wireless network. The method will be discussed with reference to the exemplary communication system 400 illustrated in FIG. 4, however, the method can be implemented with any suitable communication system.

Referring to FIG. 5, at step 502, application requirements are determined for a wireless device such as wireless device 402. The application requirements may include a data rate for transmission of data packets from an application on the wireless device. The application requirements may further indicate a requested type of control (e.g. semi-persistent) and a destination node for the application. For example, the type of service may be voice, or the application may require a certain GBR. These exemplary embodiments of application requirements may indicate a data rate required by an application to provide services without any undesirable lapse in, or loss of, service.

At step 504, network capacity for wireless device services may be determined by the access node and transmitted to the wireless device. The determined network capacity may relate to an amount of available network resources for controlling and data bearing within the access node and other network nodes, as indicated by the application requirements.

At step 506, the determined application requirements are compared with the determined network resources at each node between the wireless device 402 and the destination node. The comparison provides a finding as to whether the network resources are sufficient for the determined application requirements, which in an exemplary embodiment may be a data rate for VoIP.

At step 508, the wireless device 402 may transmit regular voice packets when it is determined that the network resources at each network node in the transmission path are sufficient to transmit at the determined data rate. These regular voice packets may be coded, transmitted, and decoded in a conventional manner for audio playback.

At step 510, when it is determined that the available network resources at a serving access node such as access nodes 404 and 406, or at a further network node, are not sufficient to transmit at the determined data rate, then an audio signal originally created from a voice source may be converted into text data packets and transmitted. Speech recognition software may be implemented on wireless device 402 and access nodes 404 and 406. In an exemplary embodiment, wireless device 402 and access nodes 404 and 406 may be capable of converting voice to text, and vice versa, prior to transmission, or upon receipt of converted data packets.

At step 512, converted text data packets are received at a receiver, which may be wireless device 402 or either access node 404 or 406. The received text data packets may be reconverted into an audio signal representing the textual words spoken in a digitally produced voice.

At step 514, the audio signal containing a reconverted voice from the text data packets may be played back at a destination. Various machine learning tools or user profiles may be used to modify playback voice in terms of pitch, inflection, or other audio features in order to mimic the actual voice contained in the original audio signal. Network nodes may use neural networks to communicate and learn audio features of different users over time, or users themselves may configure playback voice preferences.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
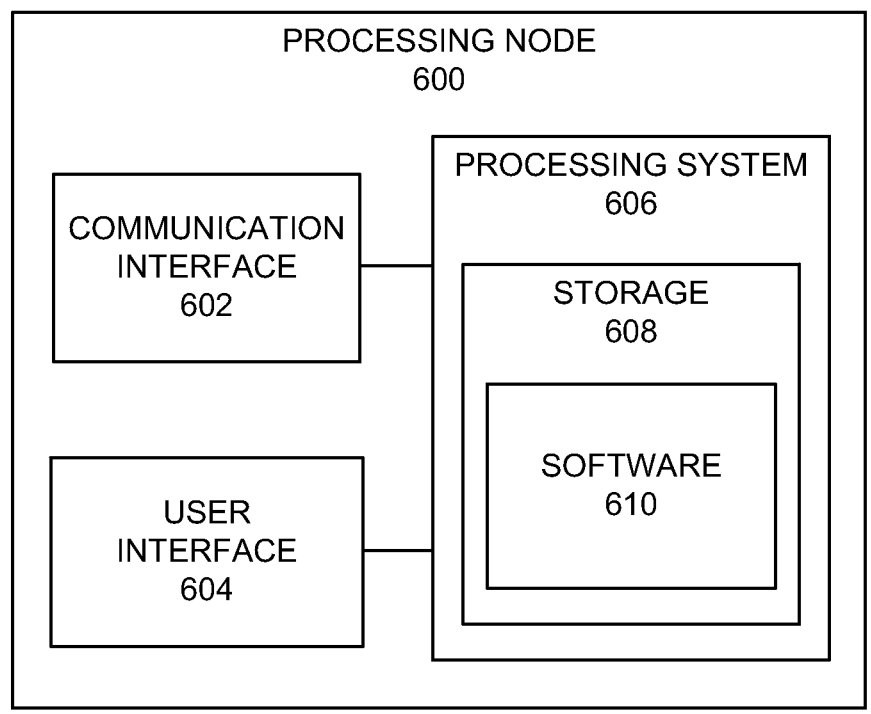
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for improving voice over internet protocol (VoIP) capacity in a wireless network, the method comprising:
   determining by an access node, application requirements for a wireless device in wireless communication with the access node, wherein the application requirements are for transmitting voice packets from the wireless device to a destination node;
   determining a network capacity at each of a plurality of network nodes in a transmission path between the wireless device and the destination node, the plurality of network nodes including additional network nodes in communication with the access node;
   comparing the determined application requirements for the wireless device with the determined network capacity for said each of the plurality of network nodes;
   when the determined network capacity for one of said additional network nodes from the plurality of network nodes in the transmission path is below the determined application requirements for the wireless device, instructing the one of said additional network nodes to convert the voice packets to text packets; and
   when the determined network capacity for the one of said additional network nodes from the plurality of network nodes in the transmission path meets the determined application requirements, and when a neural network for converting the text packets to voice packets is available at the one of said additional network nodes, instructing the one of said additional network nodes to convert the text packets to voice packets;

wherein the neural network is configured to convert the text packets to voice packets such that an audio playback resembles a voice input at the wireless device; and wherein the neural network is configured to convert the text packets to voice packets based on audio characteristics of the voice input, the audio characteristics comprising one or more of a frequency, an inflection, or an accent.

2. The method of claim 1, wherein the plurality of network nodes comprise at least one of another wireless device with which the access node is in wireless communication, another access node, a gateway node, or a controller node.

3. The method of claim 1, wherein the application requirements indicate a required guaranteed bit rate.

4. A system for improving voice over internet protocol (VoIP) or voice over long term evolution (VoLTE) capacity in a wireless network, the system comprising:

a first access node, the first access node configured to:

determine application requirements for a wireless device in wireless communication with the first access node, wherein the application requirements are for transmitting voice packets from the wireless device to a destination node;

determine an network capacity at each of a plurality of network nodes in a transmission path between the wireless device and the destination node, the plurality of network nodes including additional network nodes in communication with the access node;

compare the determined application requirements for the wireless device with the determined network capacity for said each of the plurality of network nodes;

when the determined network capacity for one of said additional network nodes from the plurality of network nodes in the transmission path is below the determined application requirements for the wireless device, instruct the one of said additional network nodes to convert the voice packets to text packets; and when the determined network capacity for the one of said additional network nodes from the plurality of network nodes in the transmission path meets the determined application requirements, and when a neural network for converting the text packets to voice packets is available at the one of said additional network nodes, instruct the one of said additional network nodes to convert the text packets to voice packets;

wherein the neural network is configured to convert the text packets to voice packets such that an audio playback resembles a voice input at the wireless device; and wherein the neural network is configured to convert the text packets to voice packets based on audio characteristics of the voice input, the audio characteristics comprising one or more of a frequency, an inflection, or an accent.

5. The system of claim 4, wherein the plurality of network nodes comprises at least one of another wireless device with which the access node is in wireless communication, a second access node, a gateway node, or a controller node.

6. The system of claim 4, wherein the application requirements indicate a required guaranteed bit rate.

7. The system of claim 4, wherein the first access node is further configured to:

continuously monitor the network resources during a VoIP or VoLTE call.

8. A method for improving voice over internet protocol (VoIP) or voice over long term evolution (VoLTE) capacity in a wireless network, the method comprising:

determining by a first access node application requirements for each of a plurality of wireless devices in wireless communication with the first access node, wherein the application requirements are for transmitting voice packets from the wireless device to a destination node;

determining an network capacity at each of a plurality of network nodes in a transmission path between the wireless device and the destination node as indicated by the application requirements for the plurality of wireless devices, the plurality of network nodes including additional network nodes in communication with the access node;

comparing the determined application requirements for each of the plurality of wireless devices with the determined network capacity for said each of the plurality of network nodes;

instructing one of said additional network nodes in the transmission path to convert voice data packets into text data packets created using speech recognition when the determined network capacity at said one of said additional network nodes is below the determined application requirements; and instructing said one of said additional network nodes from the plurality of network nodes in the transmission path to convert the text data packets into voice data packets when the determined network capacity at the one of said additional network nodes meets the determined application requirements and when a neural network for converting the text data packets into voice data packets is available as said one of said additional network nodes, wherein the neural network is configured to convert the text data packets to voice data packets based on audio characteristics comprising one or more of a frequency, an inflection, or an accent.

* * * * *